Patented May 1, 1951

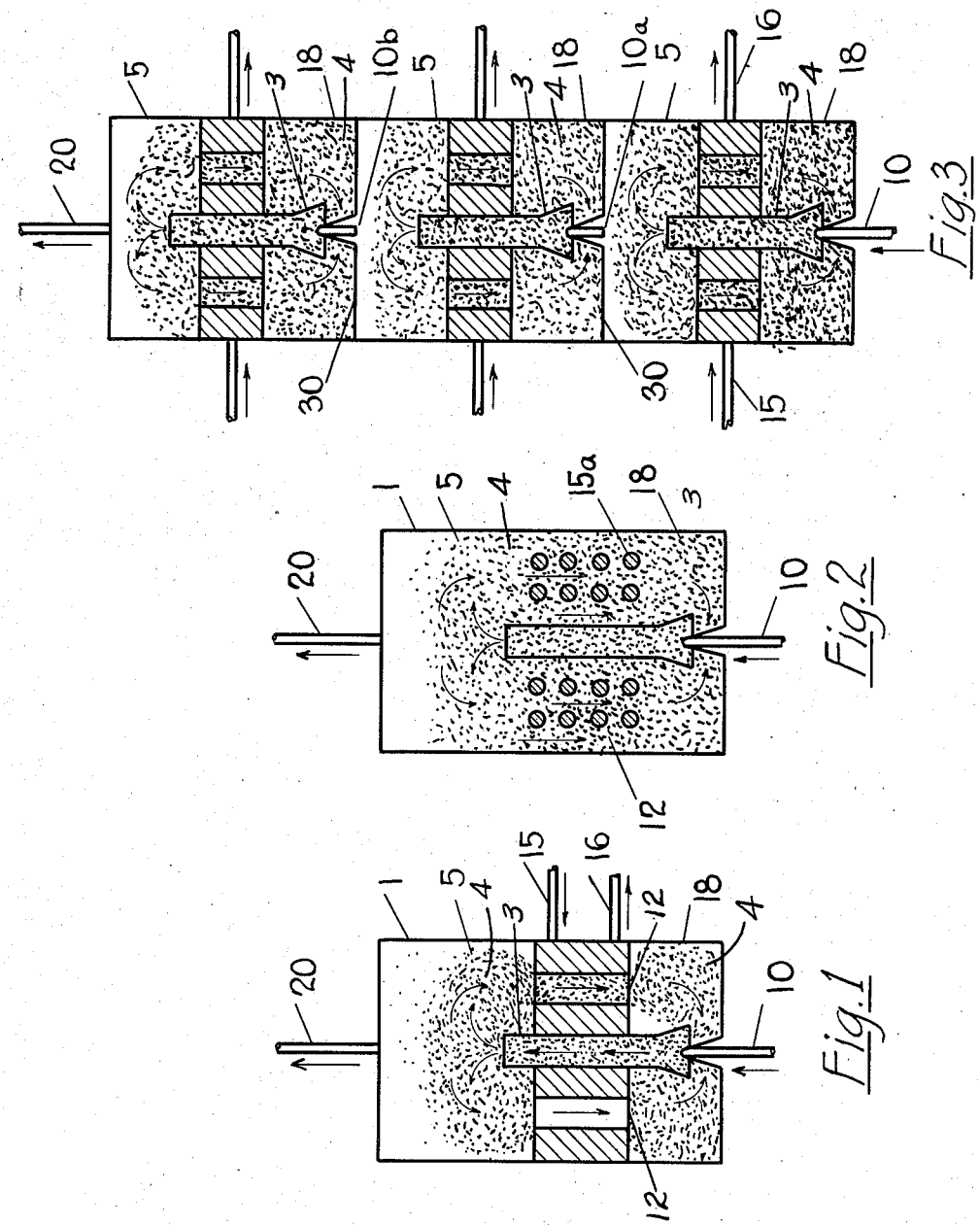

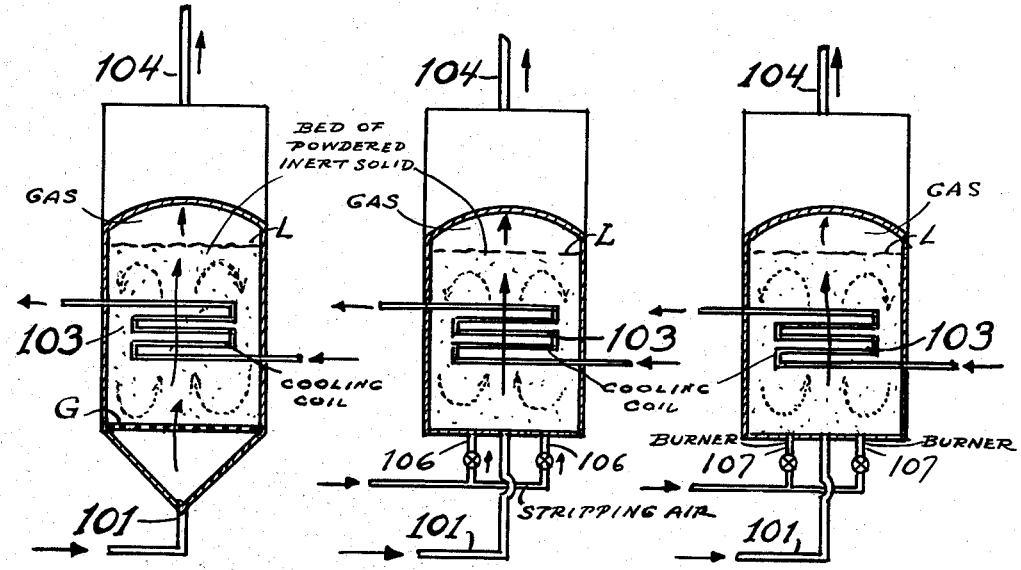
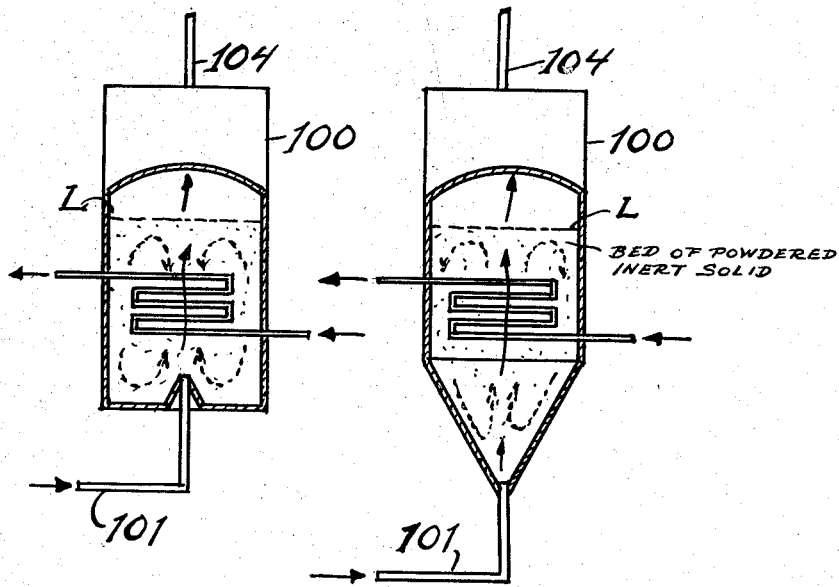

2,550,722

UNITED STATES PATENT OFFICE 2,550,722

METHOD OF RECOVERING SOLIDS FROM GASES

Walter F. Rollman, Cranford, N. J., assignor to Standard Oil Development Company, a corporation of Delaware Application July 10, 1947, Serial No. 760,143

8 Claims. (Cl. 183—119)

The present application is a continuation-in-part of my abandoned application Serial No. 532,179, filed April 21, 1944.

My invention relates to the novel features hereinafter fully disclosed in the present specification and claims, and more particularly it relates to the recovery of volatile solids from a gas.

A specific embodiment of my invention involves the recovery of phthalic anhydride in vapor from a gas stream. Phthalic anhydride is made by the catalytic vapor phase oxidation of naphthalene, and recent developments have shown that it can also be produced in a similar manner from ortho-xylene. One difficulty with either process is that it is difficult to remove the oxidized product from the gas stream exiting from the reaction zone. Phthalic anhydride is present as a vapor in very low concentration (less than 1%) in the hot gases issuing from the reaction zone, and appreciable time and large surface areas are necessary to deposit the product as a solid from the cooled gases. Ordinarily, the product gases are allowed to cool in large chambers from which the crystalline product is periodically removed. This method is cumbersome, intermittent and does not result in complete recovery of the product from the gas stream.

The main object of my present invention has to do with the improvements in the recovery of solids from the gases issuing from a reaction zone, in an expeditious and economical manner.

A specific object of my invention is to recover vaporized phthalic anhydride present in low concentration in hot gases under conditions such that the deposition of phthalic anhydride on cooling surfaces and the like is substantially completely obviated.

Briefly, my method consists of passing the product gases from the reaction zone through a heat exchanger containing an inert granular solid, in such a way that the movement of the gases causes the circulation of the solid in the exchanger, but does not cause said solid to be entrained in substantial amounts in the gases issuing from the exchanger. The product gases are thus cooled and the phthalic anhydride is deposited on particles of the circulating solids. The scouring action of the inert solid material prevents the accumulation of the phthalic anhydride on contacting heat exchanger surfaces, or on the inert solid material itself, and ultimately, finely divided particles of anhydride are carried out of the exchanger with the vent gases from which they are subsequently separated in a cyclone separator or other suitable means.

In the accompanying drawing, I have shown in Fig. 1 diagrammatically and in partial cross-section a structure which illustrates one form of a heat exchanger or cooler in which hot gases containing phthalic anhydride may be cooled; in Fig. 2 I have shown a second modification of a heat exchanger or cooler differing from Fig. 1 in that banks of cooling tubes are horizontally disposed within the heat exchanger; in Fig. 3 I have shown a heat exchanger consisting essentially of three compartments or stages of cooling in which the preferred modification of my invention may be carried into effect; and in Figs. 4 to 8 inclusive I have shown five related modifications in which a fluid coolant is caused to flow in a coil disposed in a fluidized bed of the solids, but in some of which provision is made to prevent "freezing" of the condensible solid entering the cooler, and plugging thereof, at the inlet.

Similar reference characters refer to similar parts throughout the several views.

Referring in detail to the drawings, Fig. 1 shows a heat exchanger case 1 in which is disposed concentrically a flue or pipe 3 disposed with its lower end spaced above the bottom portion of case 1 and extending to a point substantially below the upper portion of the said case, thus providing means for internal circulation of a solid, as will subsequently appear. Within the concentric tube or flue 3 there is disposed a powdered solid material 4, such as, say, powdered quartz, sand, pumice or the like having a particle size of from 20–50 mesh. This material is maintained in a fluidized condition by causing a stream of hot gases containing phthalic anhydride to be injected through an educter 10 into the lower portion of the flue 3 where it flows upwardly at a net velocity of, say, 15–20 ft. per second. The solid powdered material 4 is of course caused to flow upwardly and out of the flue 3 by the flow of the gas or vapor and to pass into a disengaging space 5 where the gas velocities are reduced to the order of 1–3 ft. per second, whereupon the powdered material 4 settles out of the gas stream and then flows downwardly, as indicated by the arrows, in a plurality of tubes 12 surrounded by a coolant, injected into the spaces around the tubes from an extraneous source through line 15, and withdrawn through line 16. After passing through the tubes 12 the solid material 4 gravitates into the lower space 18 and is subsequently injected into the flue 3 for further use in the process. The circulation of solid continues in the manner indicated.

In the process which I have described, the vaporized phthalic anhydride is cooled below its solidification point and is withdrawn overhead through line 20 with the exit gases whereupon it may then be passed through a cyclone separator, or several of them, and/or through one or more Cottrell precipitators or filters, in order to separate the phthalic anhydride crystals or flakes from the gases. I deem it unnecessary to include a showing of the cyclone separators, Cottrell precipitators, or filters, since their mode of operation and structure are well-known to those familiar with the art, and for simplicity therefore, I have not included a showing of them in the drawing.

In Fig. 2, the only substantial difference between this structure and that of Fig. 1, is that the cooling tubes 15—a are disposed laterally in close proximity to the flue 3 and that otherwise the operation of the device is substantially the same as that described in connection with Fig. 1.

In Fig. 3, I have disclosed an enlarged heat exchanger having three stages of cooling. Structurally each individual stage or compartment is similar to that shown in Fig. 1, but here I am enabled to obtain gradual cooling first with air or some other gas in the lower compartment, next with cooling water or steam in the intermediate compartment, and a final degree of cooling with brine solution in the upper compartment. The compartments are separated by separating walls 30, but are intercommunicating by means of the eductors 10—a and 10—b projecting through the said separating walls so that flow of gases and/or vapors in series through the system is permissible.

Further describing the apparatus shown in Figs. 1 to 3 it is stated that, in general, the eductor 10 must be at the extreme bottom of the flue or dryer to prevent precooling of the gases or vapors and hence plugging of the inlet line with deposited solid. The incoming gas or vapor is instantly chilled by contact with the granular solid 4 and by indirect heat exchange with the coolant as it rises through the tubes 3. Phthalic anhydride condenses out of the gases as a solid, but the motion of the solid particles prevents the deposition of the solid on the tube walls, or on the solid particles, and also prevents excessive agglomeration of the particles themselves. The particles of the inert solid carried to the space 5 ultimately gravitate to the bottom of the heat exchanger where they are rechilled and again are injected into the flues and the cycle is repeated. Any inert solid may be used, provided it is reasonably hard and dense and does not dust or disintegrate readily. The velocity of the gas in the disengaging space is so adjusted that the phthalic anhydride dust is carried overhead with the gas, but the inert solid settles out. Of course, to accomplish this, the solid particles of the inert solid must be of larger size than the phthalic anhydride particles, or other solids, or if the inert particles are not larger their densities must be greater than the material to be separated from a gasiform medium.

The modifications shown in Figures 4 to 8, inclusive, are quite similar and may be described together. Referring, therefore, in detail to Figures 4 to 8, 100 represents a cooler or heat exchanger containing a body of fluidized powdered material. In each case, a gas containing a normally solid material enters at the bottom through line 101. The condensible material contacts the powdered solids and forms therewith a dense, fluidized mass having an upper dense phase level at L. There is also disposed in each of the reactors a coil 103 through which a fluid coolant is caused to circulate for the purpose of withdrawing or abstracting heat from the solids, thus cooling the latter, and the dense, turbulent bed of solids thus cooled lowers the temperature of the incoming gas so that condensible material is deposited within the cooler 100. In Figure 4, the entering gasiform material to be cooled passes, as shown, into the conical bottom and then passes upwardly, preferably through a screen or grid G, and contacts the solids, causing condensation of the material to be solidified. The carrying gas is withdrawn overhead through line 104, in all modifications, with the entrained solid material which is condensed in the cooler.

In all cases, the upper dense phase level L will, as usual, be fixed by regulating the gas velocities somewhere within the limits of ½ to 2–3 feet per second, and also by fixing the actual number of pounds of solids that are in the cooler; and, as usual, above the dense phase level there will be a dilute phase of solids sharply decreased in concentration toward the outlet of the cooler. It is also usual to dispose solid-gas separating devices in the upper portion of such vessels to remove the inert solids and return them to the dilute phase. These details have not been described in full herein because they are by now well understood in the art.

In Figure 5, provision is made for introducing a stripping gas through lines 106. This gas may be added for the purpose of keeping the fluidized mass of solids well mixed and agitated because, of course, there is some danger that a sufficiently low temperature will prevail to cause condensation at the inlet to the cooler or in close proximity thereto. If this eventuates, it may cause plugging in this region.

In Figure 6, I have shown burners 107 for the purpose of adding heat to overcome any tendency for freezing or solidification of the condensible solids in this region.

In Figure 7, I have shown an inverted cone type of inlet for the gas stream, and here again the purpose is to prevent plugging or precondensation in the inlet region.

In Figure 8, which is quite similar to Figure 4, provision is made for causing circulation of the solids well into the conical lower section to keep the solids in this area well agitated.

As previously pointed out, my process involves recovering from a gasiform material, a solid which is present therein, in particular where the solid is present in small quantities and where the gas stream containing the normally solid material is at a sufficiently high temperature that the solid is in vapor or gaseous state. Normally, the solid is recovered from the gas or vapor by cooling below its solidification point, but if the gas is at a high temperature, it will be readily appreciated that cooling sufficiently to cause solidification of the contained solid requires a large cooling surface area. According to my process, I contact the hot gas containing the normally solid material with a cooled solid material whereby the temperature of the gaseous stream is lowered sufficiently to cause solidification of the contained normally solid material. The cooling solid is preferably in the form of a fluidized mass of particles of appreciable size, which solid material moves continuously through an eduction zone or its equivalent wherein the gaseous stream is cooled sufficiently to cause deposition of the contained solid on the cooling solid and thereafter the desired solid, removed from the particles of cooling solid by friction between the particles as a natural result of their rapid, churning motion through the vessel, is separated from the cooling solid in a disengaging space or zone and carried overhead in the original gas stream which is now cooled in the form of a suspension, while the cooling solid separates from the gas stream and disengaging space by gravity, is cooled and returned to the eduction zone for further use in the process.

It is obvious that the precise details which I have enumerated above are merely illustrative of my invention and many modifications falling within the spirit of my invention will be apparent to those familiar with this art.

What I claim is:

1. A continuous process for separating a normally solid material existing in vaporized form in a hot gasiform material stream which comprises charging the said stream into an eduction zone where it contacts a cooled inert solid material in subdivided form, causing the gasiform material and the solid material to flow concurrently upward in said eduction zone whereby the normally solid material contained in the gas stream is cooled below its solidification temperature, withdrawing the mixture of solid inert material and gaseous stream from the eduction zone and charging it into a disengaging zone where the linear velocity of the gaseous material is lowered sufficiently to permit the inert material to settle out of the gas stream by gravity but sufficiently high to maintain the solidified material in suspension, withdrawing the solidified material in suspension from the disengaging zone for product recovery, causing the separated solid inert material to flow through a cooling zone wherein heat is abstracted therefrom, and thereafter returning the cooled inert solid material to the eduction zone for further use in the process.

2. The method set forth in claim 1 in which the solid inert material has a particle size of from 20–50 mesh.

3. The method set forth in claim 1 in which the normally solid material contained in the hot gaseous material entering the eduction zone is vaporized phthalic anhydride present in amounts of substantially 1% by volume of the gas stream.

4. A continuous method of cooling a gas stream containing a minor quantity of vaporized phthalic anhydride which comprises discharging said gas stream into the first of a series of intercommunicating cooling stages, contacting the said gas stream with a circulating granular solid inert material in the first of said stages, cooled by atmospheric air, whereupon some of the phthalic anhydride is condensed as a finely divided solid suspended in the gas stream, separating the granular material from the gasiform material in the first stage by reducing the velocity of the gas stream sufficiently to permit settling by gravity of the said granular material but not the phthalic anhydride, causing gasiform material with entrained phthalic anhydride crystals to flow into a second cooling stage where it contacts a second portion of granular material circulating in heat exchange relationship with cooling water whereby a further quantity of heat is abstracted therefrom and additional phthalic anhydride is condensed, reducing the velocity of the gasiform material in the upper portion of said second stage sufficiently to permit settling by gravity of the granular material but not entrained product from the said gasiform material, conducting the gasiform material into a third cooling stage where it contacts a third portion of circulating granular material circulating in heat exchange relationship with a brine solution whereupon the gas stream is cooled to a temperature such that substantially all remaining phthalic anhydride is condensed, reducing the velocity of the gasiform material in a third disengaging stage to permit settling by gravity of the said granular material but not entrained product, and withdrawing the gasiform material together with entrained product in the upper portion of said third stage.

5. The method set forth in claim 4 in which the solid inert material and the gas stream flow concurrently upward during the several cooling stages.

6. The method set forth in claim 4 in which the particle size of the solid inert material is from 20–50 mesh.

7. The method set forth in claim 1 in which the normally solid material contained in the hot gasiform stream entering the eduction zone has a melting point above the boiling point of water.

8. The method of recovering finely divided solid particles of a vaporous material condensible to a solid from a gaseous mixture containing said vaporous material, which comprises forcing the gaseous mixture upwardly through a fluidized mass of solid particles relatively larger in size than the finely divided particles of the vaporous material to be recovered, maintaining said fluidized mass of solid particles in a cooling zone, cooling said fluidized mass of solid particles by heat exchange with a cooling fluid to below the solidification temperature of said vaporous material so that said vaporous material contained in the gaseous mixture passing through said fluidized mass is condensed to solid particles which are finely divided in said fluidized mass, and removing from said cooling zone a gaseous stream containing entrained finely divided solid particles condensed from said vaporous material while the relatively larger solid particles are kept circulating in the cooling zone.

WALTER F. ROLLMAN.

REFERENCES CITED

The following references are of record in the file of this patent:

UNITED STATES PATENTS

| Number | Name | Date |
|---|---|---|
| 2,064,468 | Foster | Dec. 15, 1936 |
| 2,393,636 | Johnson | Jan. 29, 1946 |
| 2,393,909 | Johnson | Jan. 29, 1946 |
| 2,448,135 | Vecker et al. | Aug. 31, 1948 |